Patented July 28, 1931

1,816,805

UNITED STATES PATENT OFFICE

WILMER CHARLES GANGLOFF, OF CINCINNATI, OHIO, ASSIGNOR TO THE DRACKETT CHEMICAL COMPANY, OF CINCINNATI, OHIO, A CORPORATION OF OHIO

PREPARED INGOT MATERIAL FOR USE IN DRAIN OPENING COMPOUNDS AND PROCESS FOR MAKING IT

No Drawing. Application filed June 21, 1928. Serial No. 287,357.

This invention relates to drain opening compounds and more especially to an aluminum content for such compounds and has for an object the provision of specially prepared aluminum particles by means of which a more concentrated and effective activity is produced in the compound.

Other objects will be apparent in view of the following specification.

In the manufacture of compounds for opening clogged drain pipes aluminum is one of the chief ingredients. The aluminum together with a suitable alkali such as caustic soda produces exothermic heat when placed in water. Heretofore aluminum filings and turnings as well as aluminum dust have been employed, in such drain opening compounds with the general effect of having a considerable part of the chemical action take place while in substantially a state of suspension in the liquid. This is due to the lightness of the aluminum particles and to the violence of the chemical action wherein the gases serve to drive the particles upwardly in the liquid in a drain pipe. The particles of aluminum dust, filings and turnings quickly dissipate themselves in the chemical action so that the heretofore used aluminum drain opening compounds have been but partly effected and certainly not of a desirable high standard of efficiency.

It will be appreciated that the inefficiency in drain opening compounds is due principally to the nature and form of the metallic aluminum.

The present invention provides for a specially prepared ingot granular aluminum which will promote a highly effective heat producing compound which is especially desirable for the purpose of freeing clogged drain pipes.

The prepared aluminum comprises ingot granular aluminum which is first sprayed with zinc and then rolled in order to provide an increased surface area.

The process may be carried out by spraying granular ingot aluminum with molten zinc by any of the known processes after which the sprayed ingots are pressed between rolls which flatten them and thus provide an increased surface area for them and at the same time permit all of the sprayed zinc to remain on the surface.

In the compound which may comprise the prepared aluminum and caustic soda the activity is increased for the following reasons. The increased surface area permits of greater chemical activity while the zinc retards the violence of activity at a given surface area and as a result a prolonged period of chemical activity of the proper intensity is obtained. Another highly desirable advantage lies in the fact that the specific gravity of the particles is sufficient to return them to the bottom of a vessel or pipe despite the action of the gases. In practical use the obstruction to be removed comprises the bottom or base of a water containing section of pipe so that the activity is practically confined to the desired location. For this reason the mechanical scrubbing action of a drain opening compound comprising the prepared aluminum of this invention is an item of no small import especially in view of the fact that the exothermic action is likewise practically confined to the point of obstruction.

What is claimed is:

1. The process of preparing aluminum for use in drain opening compounds, comprising employing granular ingot aluminum, then spraying molten zinc on the aluminum to provide a surface deposit for each particle, then rolling the ingots to provide increased surface area therefor.

2. The process of preparing granular ingot aluminum for the purpose described comprising utilizing ingot granular aluminum, depositing zinc on said ingots, then rolling the ingots to increase the surface area thereof.

3. The process of preparing aluminum for use in drain opening compounds, comprising using granular ingot aluminum, depositing a less active metal on the ingots and then rolling said ingots to increase the surface area thereof.

4. As a new article of manufacture a prepared grain ingot aluminum comprising mechanically flattered ingots of aluminum with particles of zinc deposited on the surface area.

5. As a new article of manufacture a flattened aluminum ingot having minute particles of zinc deposited on its surface.

6. A prepared grain aluminum for use in drain opening compounds comprising a somewhat irregular flattened aluminum body having minute particles of zinc deposited on the surface thereof.

In testimony whereof, I have hereunto subscribed my name this 20th day of June, 1928.

WILMER CHARLES GANGLOFF.